C. H. VOGT.
MEAT PRODUCT AND METHOD OF MAKING THE SAME.
APPLICATION FILED APR. 24, 1920.

1,408,914.

Patented Mar. 7, 1922.

Inventor:
Charles H. Vogt,
By Jas. C. Wobensmith
Attorney.

UNITED STATES PATENT OFFICE.

CHARLES H. VOGT, OF PHILADELPHIA, PENNSYLVANIA.

MEAT PRODUCT AND METHOD OF MAKING THE SAME.

1,408,914.                Specification of Letters Patent.      Patented Mar. 7, 1922.

Application filed April 24, 1920. Serial No. 376,198.

*To all whom it may concern:*

Be it known that I, CHARLES H. VOGT, a citizen of the United States, residing at Philadelphia, in the county of Philadelphia, State of Pennsylvania, have invented certain new and useful Improvements in Meat Products and Methods of Making the Same, of which the following is a specification.

My invention relates to a meat product, and the method of making the same, whereby certain portions of small animals, which heretofore have been utilized in cheaper forms of meat products, may be manufactured into a much more desirable form of food commodity. Heretofore, it has been customary to utilize the tongues of small animals such as hogs, calves, sheep, goats and the like, by chopping the same into small particles and incorporating them as component parts of relatively cheap products such for examples, as sausages of various types, this having been thought necessary because such animal tongues are of such relatively small size and have other characteristics which render them undesirable as separate meat products. The object therefore, of my present invention is to provide a novel form of meat product composed principally of such small animal tongues and which product is of a very desirable character, and can be readily marketed at a much higher price than the products in which such tongues have heretofore been utilized.

The nature and characteristic features of my invention will be more readily understood from the following description taken in connection with the accompanying drawing forming part hereof, in which—

Figure 1:
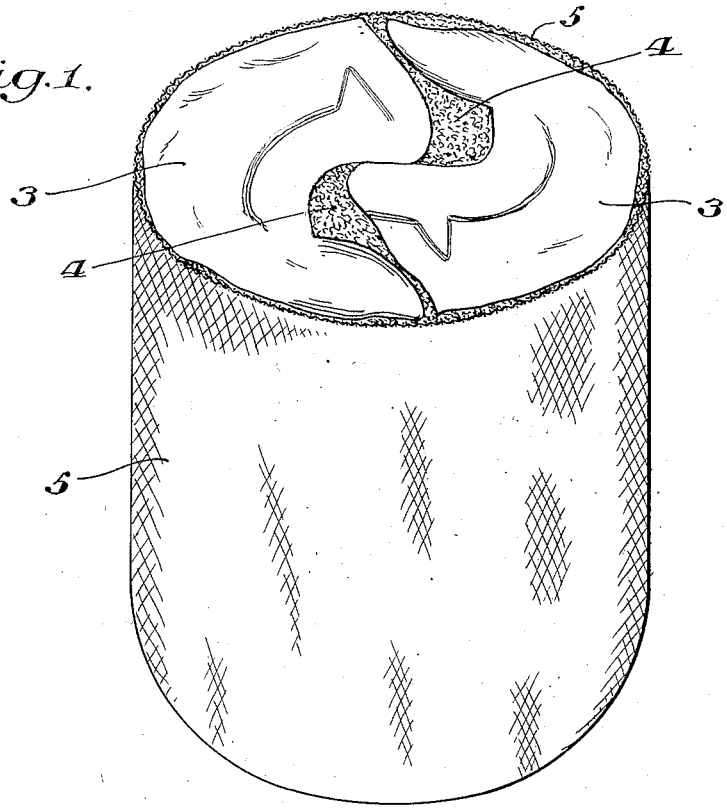
Figure 2:
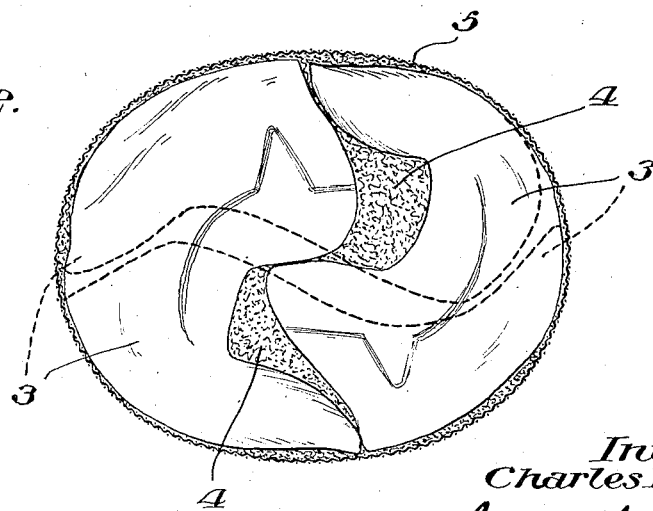

Figure 1 is a perspective view of a portion of a meat product embodying the main features of my invention; and Figure 2 is a transverse section thereof.

In carrying out my present invention, the tongues of small animals such as hogs, calves, sheep, goats and the like are preferably first slightly cooked and the undesirable portions thereof are then trimmed off. The tongues 3 are then coated with and have incorporated therewith a quantity of fine cut edible meat 4 of a quantity sufficient for a purpose which will later appear, the same being manipulated by hand or likewise, to cause the tongues to be completely coated and surrounded with the aforesaid fine cut meat. The tongues are now carefully packed in a suitable bag 5 preferably of textile material, as illustrated in the drawing, the bag 5 preferably being of such size and shape as to permit the tongues 3 to be arranged in what might be termed layers of two each, the same being positioned in a more or less symmetrical order and having the ends overlapping each other in successive layers, whereby the bag or other container will have the tongues closely packed therein in a substantially solid mass, but with the voids or interstices filled in with the hereinbefore mentioned fine cut meat 4 which is of a sufficient quantity for that purpose, and which also serves to cause the tongues to adhere to each other in a solid coherent mass, as will later appear.

The product as thus assembled, and while in the bag in which the same is packed, is then preferably smoked in the usual manner familiar to those skilled in the art, for about one hour, after which the same is placed in a mold in which it is pressed to the desired shape, and while retained in said mold is thoroughly cooked into a solid coherent mass. The product is then removed from the mold, but remaining in the bag in which it is packed, the same is then chilled, after which it is ready for the market.

By following the process as hereinabove set forth, there will be produced a novel form of meat product composed principally of whole small animal tongues united together in a solid coherent mass having desirable characteristics, and which is particularly adaptable for slicing for use in sandwiches or as a table delicacy.

Having thus described the nature and characteristic features of my invention, what I claim as new and desire to secure by Letters Patent is—

1. A food product comprising a solid coherent mass made up of whole small animal tongues arranged in close relationship with fine cut edible meat filling the voids and distributed over the surfaces of said tongues.

2. A food product comprising a solid coherent cooked mass made up of whole small animal tongues arranged in close relationship with fine cut edible meat filling the voids and distributed over the surfaces of said tongues.

3. A food product comprising a solid coherent smoked and cooked mass of desired shape made up of whole small animal tongues arranged in close relationship with fine cut edible meat filling the voids and distributed over the surfaces of said tongues.

4. A food product comprising a solid coherent cooked mass of desired shape contained in a suitable bag and made up of whole small animal tongues arranged in close relationship with fine cut edible meat filling the voids and distributed over the surfaces of said tongues.

5. A food product comprising a solid coherent cooked mass of desired shape and made up of whole small animal tongues arranged in layers in close relationship with fine cut edible meat filling the voids and distributed over the surfaces of said tongues.

6. The method of making a food product which consists in coating and incorporating whole small animal tongues with a suitable quantity of fine cut edible meat, then packing the tongues in close relationship in a suitable bag with the aforesaid fine cut meat filling the voids therein, and then cooking the same into a solid coherent mass.

7. The method of making a food product which consists in coating and incorporating whole small animal tongues with a suitable quantity of fine cut edible meat, then packing the tongues in close relationship in a suitable bag with the aforesaid fine cut meat filling the voids therein, placing the same in a mold whereby the product is pressed to the desired shape and cooking the same while retained in said mold.

8. The method of making a food product which consists in first partially cooking whole small animal tongues, then coating and incorporating therewith a suitable quantity of fine cut edible meat, then packing the same in close relationship in a bag of textile material with the aforesaid fine cut meat filling the voids therein, placing the same in a mold whereby the product is pressed to the desired shape and cooking the same while retained in said mold.

9. The method of making a food product which consists in first partially cooking whole small animal tongues, then coating and incorporating therewith a suitable quantity of fine cut edible meat, then packing the tongues in close relationship in a bag of textile material with the aforesaid fine cut meat filling the voids therein, then smoking the same, then placing the same in a mold whereby the product is pressed to the desired shape and cooking the same while retained in said mold.

In testimony whereof I have hereunto signed my name.

CHARLES H. VOGT.